US008732841B2

(12) United States Patent
Ronning et al.

(10) Patent No.: US 8,732,841 B2
(45) Date of Patent: May 20, 2014

(54) SOFTWARE LICENSE SERVER WITH GEOGRAPHIC LOCATION VALIDATION

(75) Inventors: Joel A. Ronning, Excelsior, MN (US); David Efergan, Highland Park, IL (US); Pete Olson, Minneapolis, MN (US); Amir Rauf, Shakopee, MN (US)

(73) Assignee: Digital River, Inc., Minnetonka, MN (US)

( * ) Notice: Subject to any disclaimer, the term of this patent is extended or adjusted under 35 U.S.C. 154(b) by 1131 days.

(21) Appl. No.: 11/107,107

(22) Filed: Apr. 14, 2005

(65) Prior Publication Data

US 2006/0059100 A1    Mar. 16, 2006

Related U.S. Application Data

(60) Provisional application No. 60/562,177, filed on Apr. 14, 2004.

(51) Int. Cl.
*G06F 7/04* (2006.01)
*G06F 17/30* (2006.01)

(52) U.S. Cl.
USPC .......................................................... 726/26

(58) Field of Classification Search
USPC ............... 726/26; 705/16, 21, 59, 71; 380/44, 380/262, 278, 279
See application file for complete search history.

(56) References Cited

U.S. PATENT DOCUMENTS 5,530,752 A   6/1996  Rubin
5,765,152 A   6/1998  Erickson
5,892,900 A   4/1999  Ginter et al.
6,006,332 A * 12/1999  Rabne et al. ...................... 726/6
6,021,438 A   2/2000  Duvvoori et al.
6,119,108 A   9/2000  Holmes et al.

(Continued)

FOREIGN PATENT DOCUMENTS

EP          0769751 A1    4/1997
JP          2002510814    10/1999

(Continued)

OTHER PUBLICATIONS

Brian Pereira, "A suitable software licensing policy," Network Magazine, Sep. 2002, 7 pages (http://www.networkmagazineindia.com/200209//cover1.shtml), Indian Express Group, Mumbai, India.

(Continued)

*Primary Examiner* — Dante Ravetti
(74) *Attorney, Agent, or Firm* — Billion & Armitage; Richard E. Billion

(57) ABSTRACT

A computer software license management system wrapper for use in a local computer is described. The software wrapper includes a wrapper interface that provides controlled access to a computer software application file. The software application file is encapsulated by security software code to protect it from unauthorized access. The software wrapper also includes a software license key identifying a license policy specifying a use limitation within a geographic boundary. In addition, the software wrapper includes a license validation mechanism that periodically determines compliance with the license policy. The license validation mechanism permits access by another process operating on the local computer through the wrapper interface in response to a valid license confirmation signal received from the license server. A license server that utilizes and an electronic storefront that sells software license wrappers having software use limitations within a geographic boundary also are described.

7 Claims, 9 Drawing Sheets

(56) References Cited

U.S. PATENT DOCUMENTS

| | | |
|---|---|---|
| 6,185,686 B1 | 2/2001 | Glover |
| 6,252,547 B1 | 6/2001 | Perry et al. |
| 6,263,113 B1 | 7/2001 | Abdel-Motalev et al. |
| 6,389,403 B1 | 5/2002 | Dorak, Jr. |
| 6,519,700 B1 | 2/2003 | Ram et al. |
| 6,587,888 B1 | 7/2003 | Chieu et al. |
| 6,665,715 B1 | 12/2003 | Houri |
| 6,697,948 B1 | 2/2004 | Rabin et al. |
| 6,757,740 B1 | 6/2004 | Parekh et al. |
| 6,760,324 B1* | 7/2004 | Scott et al. ............ 370/352 |
| 6,772,340 B1 | 8/2004 | Peinado et al. |
| 6,859,791 B1 | 2/2005 | Spagna et al. |
| 7,024,466 B2* | 4/2006 | Outten et al. ............ 709/219 |
| 7,100,204 B1* | 8/2006 | Myllymaki et al. ............ 726/22 |
| 7,140,042 B2 | 11/2006 | Verma |
| 2001/0011253 A1 | 8/2001 | Coley et al. |
| 2002/0016831 A1* | 2/2002 | Peled et al. ............ 709/219 |
| 2002/0016846 A1* | 2/2002 | Ono ............ 709/229 |
| 2002/0017977 A1 | 2/2002 | Wall |
| 2002/0023010 A1* | 2/2002 | Rittmaster et al. ............ 705/26 |
| 2002/0026846 A1* | 3/2002 | Lee ............ 74/473.18 |
| 2002/0048369 A1 | 4/2002 | Ginter et al. |
| 2002/0069420 A1 | 6/2002 | Russell et al. |
| 2002/0072984 A1* | 6/2002 | Rothman et al. ............ 705/26 |
| 2002/0107809 A1 | 8/2002 | Biddle et al. |
| 2003/0009687 A1* | 1/2003 | Ferchau et al. ............ 713/200 |
| 2003/0033205 A1 | 2/2003 | Nowers et al. |
| 2003/0065571 A1* | 4/2003 | Dutta ............ 705/26 |
| 2003/0083994 A1 | 5/2003 | Ramachandran et al. |
| 2003/0083995 A1 | 5/2003 | Ramachandran et al. |
| 2003/0083998 A1 | 5/2003 | Ramachandran et al. |
| 2003/0083999 A1 | 5/2003 | Ramachandran et al. |
| 2003/0097654 A1 | 5/2003 | Franken et al. |
| 2003/0135513 A1 | 7/2003 | Quinn et al. |
| 2003/0154387 A1 | 8/2003 | Evans et al. |
| 2003/0161473 A1* | 8/2003 | Fransdonk ............ 380/277 |
| 2003/0236886 A1 | 12/2003 | Oren et al. |
| 2004/0083180 A1* | 4/2004 | Braun et al. ............ 705/59 |
| 2004/0088176 A1 | 5/2004 | Rajamani |
| 2004/0190715 A1 | 9/2004 | Nimura et al. |
| 2004/0225894 A1 | 11/2004 | Colvin et al. |
| 2004/0249762 A1 | 12/2004 | Garibay et al. |
| 2005/0131832 A1 | 6/2005 | Fransdonk |

FOREIGN PATENT DOCUMENTS

| | | |
|---|---|---|
| JP | 2001265733 | 9/2001 |
| JP | 2002006973 | 1/2002 |
| JP | 2003108252 | 4/2003 |
| JP | 2004013909 | 1/2004 |
| JP | 2004086441 | 3/2004 |
| WO | WO 00/06709 | 11/2000 |
| WO | WO 02/089442 A1 | 11/2002 |

OTHER PUBLICATIONS

"NetAcuity® Intelligence for the Internet," Digital Envoy, Norcross, GA (http://www.digitalenvoy/pdf/netacuity.pdf).

Berkhin et al., Interactive Path Analysis of Web Site Traffic, Proceedings of the seventh ACM SIGKDD international conference on Knowledge discovery and data mining, Held in San Francisco, California on Aug. 26-29, 2001, Published 2001, pp. 414-419.

"FLEXlm Programmers Guide" [Online] Dec. 1994, XP002591935, USA, Globetrotter Software, Inc. Retrieved from the Internet: URL:http://mecca.spd.louisville.edu/ebt-bin/nph-dweb/dynaweb/SGI_Developer/FLEXlm_PG/@Generic_BookTextView/4;cs=fullhtml;pt=35> [retrieved on Feb. 7, 2011] Chapter 1.

"FLEXlm Programmers Guide" [Online] Dec. 1994, XP002591935, USA, Globetrotter Software, Inc. Retrieved from the Internet: URL:http://mecca.spd.louisville.edu/ebt-bin/nph-dweb/dynaweb/SGI_Developer/FLEMIm_BookTextView/4;cs=fullhtml;pt=35> [retrieved on Jul. 14, 2010] Chapter 4.

Buchheit M.: Software-Kopeirschulz:, Elektronick, Weka Fachzeitschriftenverlag, Poing, DE, vol. 41, No. 14, Jul. 7, 1992, pp. 68-74, XP00307635 ISSN:0013-5658.

* cited by examiner

FIG. 5

Digital River Network Portal :: Product List

— 176

Product ID 9763000 has been added.
*you must first place a test order for your product, then submit to the network*

- To edit a product, click on the Product ID.
- To test your product, click on the "Test" link.
- To submit to the network, check the box on the left and then click "submit to network" at the bottom of the page.

Pages: 1 of 1

FIG. 6

| Product ID | Name | Sku | Store |
|---|---|---|---|
| 9763000 | DRTestProduct | DRTestProduct | Design |

Page: 1 of 1 Refine Search
Results Per Page: 25 50 75 100

FIG. 7

Unlock Codes
Enable unlock codes for the product and identify the distribution requirements.

☑ Enable unlock codes for this product

- *Unlock Codes Per Unit: 1
- *Distribution: All line item units get the same number
- *Generation method: DR Hosted with Armadillo - Country Based
- *Key Type: Accept ShortV2 keys only
- *Armadillo encryption template: 123123
- *Armadillo encryption level: 9
- *Hardware Locking Level: Standard
- Armadillo other Info 1: 0
- Armadillo other Info 2: 0
- Armadillo other Info 3: 0
- Armadillo other Info 4: 0
- *Maximum reissues: 5
- *Activations Allowed: 1
- Use Digital River Edition keys: ☑
- Country: Albania
- Maximum number of days for extension: 0

[update] [save]

Congratulations!
A copy of your electronic order receipt has been emailed to you. Please retain this email for your records.
Your Order ID is 3321198500

To complete your licensing, click on the 'Finish' button below and an activation key will be automatically created and installed into your software program.

If you have any questions, please visit us at
http://drh.digitalriver.com/cs

Click 'Finish' to complete your license installation.

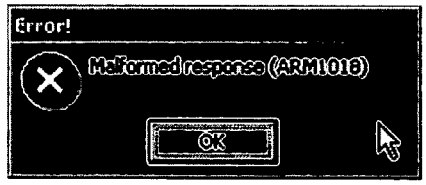

Dear Paresh Gajria:

This notice is to inform you that you have violated the license of DRTestProduct. Too many violations will deactivate your product.

Should you have any questions please visit us at www.digitalriver.com/cs.

Sincerely,
Digital River Customer Service.

FIG. 18

SOFTWARE LICENSE SERVER WITH GEOGRAPHIC LOCATION VALIDATION

RELATED APPLICATIONS

This application claims the benefit of U.S. Provisional Patent Application No. 60/562,177, filed Apr. 14, 2004.

This application is related to the following co-pending applications:

U.S. patent application Ser. No. 11/106,770, filed Apr. 14, 2005, entitled "Software Wrapper Having Use Limitation Within A Geographic Boundary"; and U.S. patent application Ser. No. 11/107,484, filed Apr. 14, 2005, entitled "Electronic Storefront That Limits Download Of Software Wrappers Based On Geographic Location".

FIELD OF THE INVENTION

The present invention relates to digital rights management of licensable goods. More particularly, the present invention relates to a system and related tools for digital rights management across geographic boundaries (e.g. countries or other political boundaries) where legal protection of digital rights to computer software, news & entertainment media, music, and other electronically delivered intellectual property might vary by those geographic regions.

BACKGROUND OF THE INVENTION

Many commercial transactions are based on the licensing of property, products or services by a licensor for a limited scope and which may involve a limitation of the scope and/or duration of their use by a licensee. Licenses typically operate to restrict or otherwise limit the user's ability to assign, redistribute, resale or otherwise change the intended beneficiary of the license, while other restrictions may be directed to how, when, where and for how long the use may occur. Both parties generally derive an economic benefit from structuring a transaction in such a fashion: (1) the licensor retains ownership interest in the subject of the license and control over who may make, use or sell the same; and (2) the licensee enjoys the benefit of using the property, product or service at a reduced cost as compared to the underlying cost to a licensee to outright acquire or develop the property, product or service.

Individuals may encounter a variety of circumstances in their daily lives that involve the licensing of goods and services. For example, renting an apartment; or a hotel room, watching a film at a movie theatre; renting or leasing a car, obtaining permission from the state to drive or operate a motor vehicle, making a telephone call with a calling card, joining a private gym or country club, or using computer software applications are all forms of licensing.

In the commercial software industry software application products have generally been sold on a purchase basis with license agreements for limited use of the software. Sales representatives often market the software to prospective end-users and, upon purchase in a conventional fashion, the software is then provided to the user on diskettes or other media along with, for example, user manuals. As such, many software applications have been sold primarily on a long-term or permanent license basis with support service being provided under long-term, fixed-price contracts.

From an end-user's perspective, software acquisition under a conventional purchase based license agreement can be expensive. Specifically, once an end-user initially invests in a conventional software purchase, the acquisition of additional software titles from other vendors may not be economically feasible. Moreover, the vendor may charge the user for application upgrades and continuing product support. In this regard, many end-users may become dependent on a particular vendor and/or application product.

From a software application vendor's perspective, a large portion of revenue is generally spent on sales, marketing and user support through direct sales and the use of VAR (value added reseller) channels. However, Internet access and the proliferation of high speed connections (i.e., T1, cable and DSL) have made the electronic distribution of software application products more feasible. As the popularity and accessibility of the Internet has grown, vendors have increasingly looked to the Internet as an effective medium for reducing sales and marketing costs. As a result, some vendors have expanded to support electronic purchase and delivery of software applications over the Internet, but generally under the conventional license agreement model discussed immediately above. However, a need exists for a comprehensive method to manage, track and customize software application licenses.

In addition to cost and efficiency concerns, vendors often are confronted with the issue of software piracy and other unlicensed, unauthorized or illegal use. As a result, vendors have generally implemented certain security features within software products to protect the application from unlicensed use. The vendor may therefore find that expensive additional resources are required to support these licensing security features in addition to support for the software application itself. In many instances, the support for a software application includes live telephone support. As many as 50% of the technical support telephone calls that a vendor receives may involve licensing security issues. Often, this support can prove to be a burden on the vendor's available development resources. Accordingly, a need exists for a licensing system that can be outsourced to a third party for management and support so that software vendors can operate more efficiently by reallocating resources to, for example, application development.

Electronic distribution of software applications also poses a security risk for many vendors. Conventionally, when an encryption method is employed to protect the software code, protection after decryption of the software code may be minimal or non-existent. Accordingly, once the software application has been delivered to the end-user's platform, it may be difficult for the vendor to protect against tampering and software piracy. Furthermore, some electronic security solutions implemented by vendors are cumbersome. For example, the user may be required to maintain a data connection with an Application Service Provider (ASP) while using the distributed software. An ASP working environment may also limit access to new users to the distributed application, if other users occupy all available access points or licensed seats to the vendor site.

Some existing software application licensing systems implement a client-server model which includes a method of wrapping licensing instructions around a software product and integrating licensing management as part of the installation process. The license server contains a license database for tracking and managing existing software licenses, product definitions, wrapped software products, online purchase processing functions, and end-user software registration functions.

A typical method for software licensing in this client-server model includes the following steps. A developer creates a software application product. The developer selects a licensing management service. Using tools integrated from the licensing management service, the developer generates instructions for wrapping license management code around the application to create a license management protected application. These wrapping instructions describe, among other things, a particular license policy that the developer wants to implement for this application. Alternatively, the developer could use a software development kit to embed license management code into the application that would result in a license management protected application with the desired license policy. The protected application may then be packaged and delivered to end-user licensees for subsequent installation and use. When a local instance of the protected application is instantiated by an end-user licensee management client, the management client checks for a license key on the client system. If a license key is found, the management client unlocks or unwraps the protected application and provides access to the software to the end-user. If no license key is found, the management client requests authorization over an Internet communication link from the license management server to provide appropriate access to the wrapped application. If the license management server confirms a valid license, a license key is provided to the management client and saved on the client system. If the license management server does not locate a valid license, the license management server initiates an order fulfillment application and otherwise manages a software license sales transaction. This order fulfillment application may be web browser-based Java applet, embedded in the application, part of the license management wrapper, or any other software technology that implements order management and fulfillment functions.

The client-server model of software licensing described above may be augmented with an electronic storefront that can be provided through an application buying option embedded in the software application or wrapper as well as a link to a electronic commerce website. An end user can search the electronic store and then download a desired protected application and license management client. Once the license management client and protected application are installed on the client system, license management steps like the previous described steps would be preformed to enable use of the protected application on the client system. In some systems, the client management software is wrapped with the protected application to form one downloadable and executable software installation package.

License policies implemented in the wrapped/protected application can take many forms. For example, the protected software may be licensed by an end user for a specified time period and then either renewed or cancelled when prompted by the management client. Similarly, the protected software may be licensed with varying levels of functionality depending on the needs of the end user (e.g., trialware, basic, medium, and full featured implementations). An end user can unlock the various levels of functionality by interacting with the order fulfillment functions on the license server to pay for a desired license level.

A need exists for a system to address these and similar deficiencies associated with the effective and efficient management of licensing in a wide variety of licensee and licensor market environments. With respect to the software application industry in particular, a need exists for a turnkey electronic or software only method for obtaining licenses and distributing software applications. Such a software only based licensing system would eliminate the cost, complexity, and administration associated with licensing systems incorporating custom hardware-based keys or other custom devices. A need also exists for a secure method for vendor distribution of software and for maintaining security on the end-user's platform.

One aspect of existing software licensing systems that is not presently addressed is adjustment of software application pricing based on local economic conditions. Such local economic condition pricing policies have been implemented in other types of commodities such as clothing, foods and pharmaceuticals. Disparate pricing policies between elastic and inelastic markets have been described by economists in conjunction with the "Ramsey Theory." Geographic regions are often used to define different markets.

According to disparate pricing theory, it may be profitable for a company to adjust prices of a product to local market conditions. A cheaper product with a smaller profit may be acceptable to broaden the market size and thus sales volume in low-income geographic areas. In the pharmaceutical industry, high profit sales from higher income areas are used to fund research and development costs. Low profit-low cost sales to low-income countries drive a higher sales volume that in turn helps to keep per unit drug production costs low by increasing the overall manufacturing volume. In order for this disparate pricing policy to work, the cheaper products must be kept from high priced markets to preserve higher profit margins in the higher income geographic areas for a higher cost product. Rigorous enforcement of patent rights and copyrights in various countries has enabled the pharmaceutical industry to successfully implement and maintain disparate pricing policies for certain types of drugs. However, the cost of legal enforcement to maintain this disparate pricing policy has likely been very high, perhaps costing the pharmaceutical industry hundreds of millions of dollars.

Like in the pharmaceutical industry, the incremental cost of manufacturing in the software industry is low once the high upfront research and development cost for a particular software product has been paid for. Unlike the pharmaceutical industry, rigorous enforcement of patent rights and copyrights may not be practical. Illegal copies of drugs can be identified and stopped as they are imported into or exported from a country. In contrast, software is often transmitted electronically over packetized data networks such as the Internet that have virtually no controls in place to stop data from being transmitted from one country to another. As such, stopping illegal copies of software from being imported into or exported from a particular country may be impractical.

Software piracy is common in low-income geographic areas. If a more affordable software product license is made available for purchase in these low-income geographic areas, users of pirated software may be willing to purchase legitimate copies of software licenses. If these former pirated software users purchase legitimate copies of the software licenses, the software vendor obtains licensing revenues that they otherwise would not have received and expands their user base. Such users of affordable legitimate software licenses would avoid legal prosecution for using pirated software products and would enjoy the benefits of regular users such as customer support and software updates. By providing the affordable licenses, a software vendor creates a larger loyal user base of their software products that may upgrade to a higher level software license as the user's economic position changes.

It may be beneficial to implement some form of disparate pricing policy based on geographic areas in the software industry so that higher volumes of sales can be achieved. Therefore, a need exists for a software licensing system that can implement disparate pricing policies based on geographic locations. Preferably, such a software licensing system would be able to enforce use limitations for the software based on geographic areas so that lower priced software products can be kept from higher income geographic areas where higher priced equivalent software products are sold.

The present invention provides a solution to these needs and other problems, and offers other advantages over the prior art.

BRIEF SUMMARY OF THE INVENTION

The present invention is related to a software system that solves the above-mentioned problems. In accordance with one embodiment of the invention, a computer software license management system wrapper for use in a local computer is described. The software wrapper includes a wrapper interface that provides controlled access to a computer software application file. The software application file is encapsulated by security software code to protect the software application file from unauthorized access. The software wrapper also includes a software license key identifying a license policy specifying a use limitation within a geographic boundary. In addition, the software wrapper includes a license validation mechanism. The license validation mechanism preferably is configured to periodically determine compliance with the license policy by utilizing pre-existing communication infrastructure to provide a communication link between the local computer and a license server. The license validation mechanism permits access by another process operating on the local computer through the wrapper interface in response to a valid license confirmation signal received from the license server. A license server that utilizes and an electronic storefront that sells software license wrappers with embedded license policy having limitations on using a software application within a geographic boundary also are described. In addition, a method of implementing a license policy with limitations on using a software application within a geographic boundary is described.

Additional advantages and features of the invention will be set forth in part in the description which follows, and in part, will become apparent to those skilled in the art upon examination of the following or may be learned by practice of the invention.

BRIEF DESCRIPTION OF THE DRAWINGS

FIG. 5 shows a user interface for adding additional product information for a wrapped software application on an administrative website.

FIG. 6 shows a dialog box indicating a wrapped software application has been added to an administrative website.

FIG. 7 shows a search results dialog box based on a search using the product ID shown in FIG. 6.

FIGS. 8 and 9 show additional user interfaces for selecting various options in a country-based licensing schema.

FIG. 16 shows a sample license installation dialog box that can be shown to a customer upon submitting an order to purchase software based on the order form shown in FIGS. 14 and 15.

FIG. 17 is a sample error message shown to a customer that attempts to install a software license on a computer system that violates a licensing policy embedded in the wrapped software application.

FIG. 18 shows a sample warning message that can be shown to a user when a violation of a licensing policy embedded in a wrapped software application is detected.

DETAILED DESCRIPTION

An opportunity exists to gain incremental revenue for software vendors to into countries with price points that make physical sales impractical. By solely selling digital products inside these countries incremental revenue improvements can be achieved in otherwise un-served markets. Such digital only software license products can be sold with a disparate pricing policy based on geographic areas or countries. For example, a price for a software license limited to use in China could be set lower than a software license limited to use in Japan. In a preferred embodiment, a country-based licensing schema entails licensing a software product protected with encryption technologies and having that software phoning home on a regular basis to report on where it is working in the world. Various business rules can be implemented to handle situations where the licensed user is somehow violating the geographic use limitations of the license.

Figure 1:
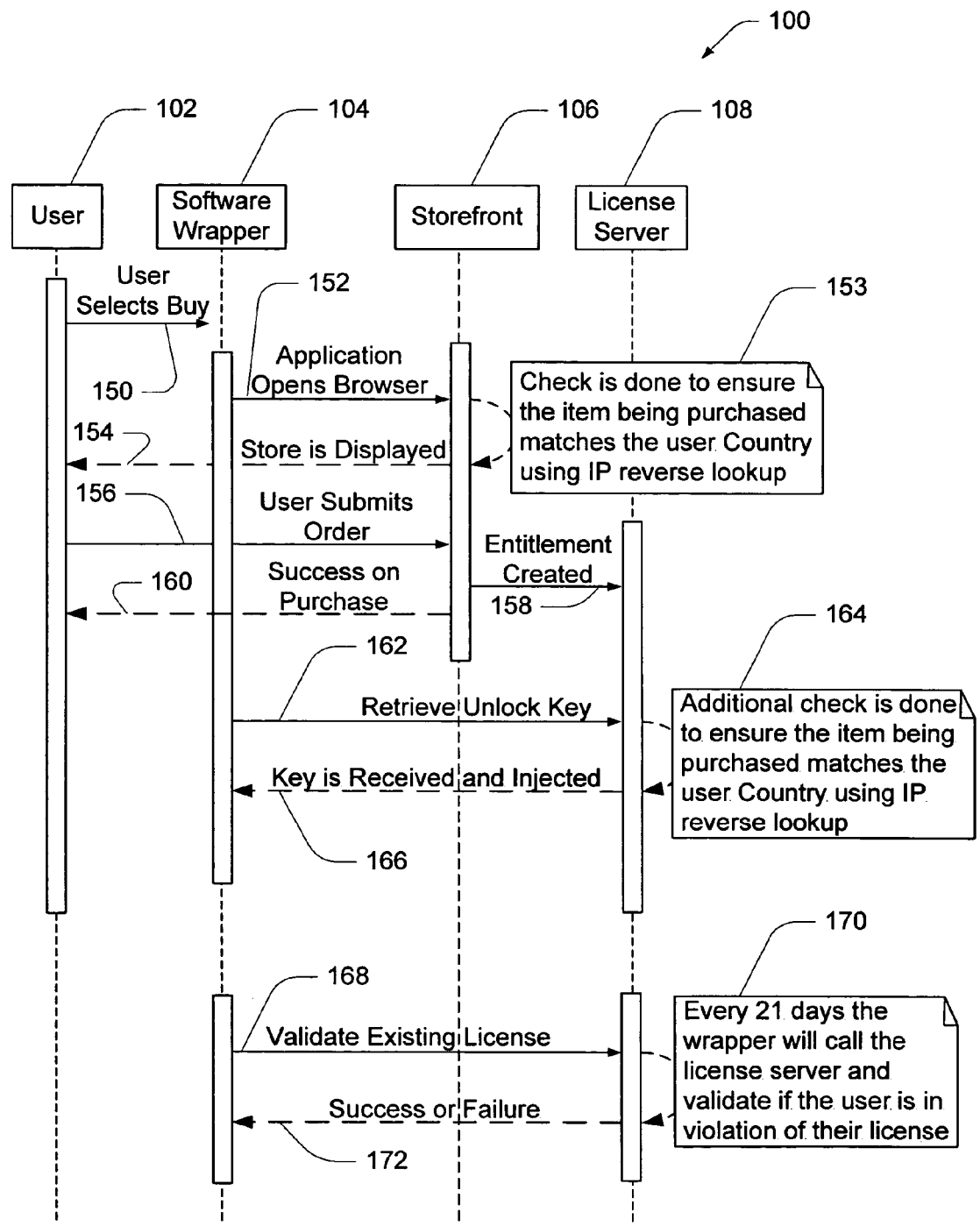
FIG. 1 is data flow of an embodiment of the present invention country-based licensing schema.
Figure 2:
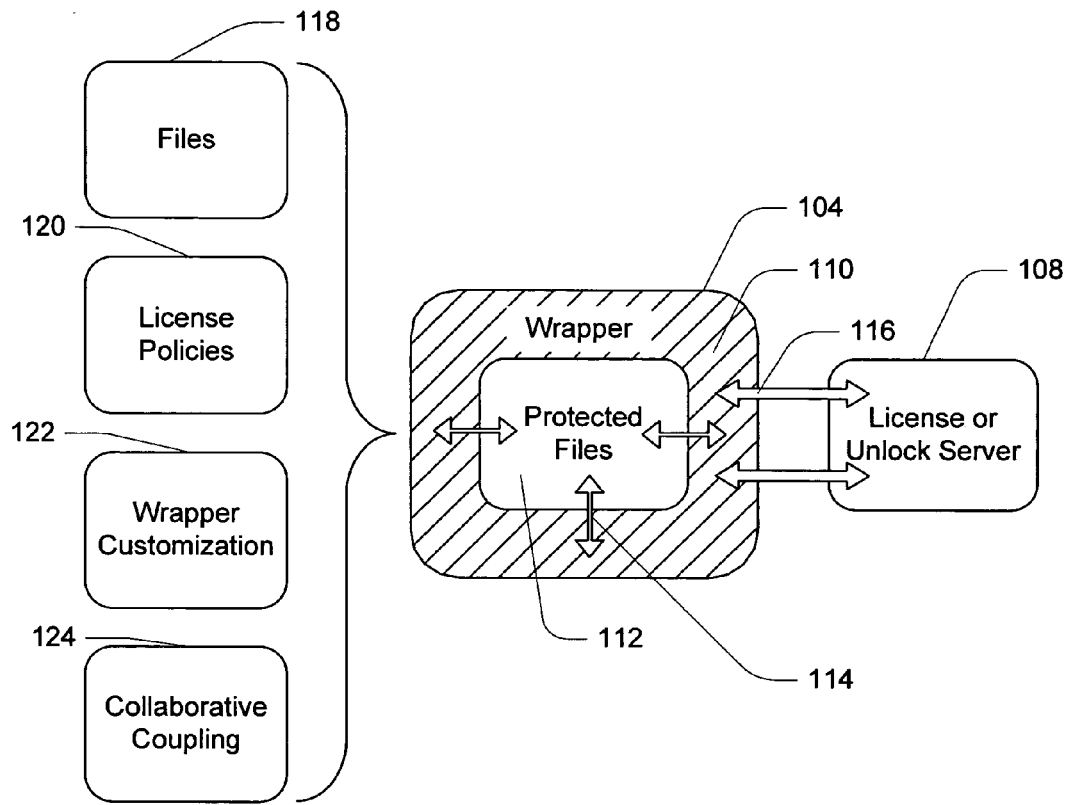
FIG. 2 is a diagram showing interaction of a wrapped software application with a license server.

Referring now to FIG. 1 and 2, the country-based licensing schema 100 includes providing license policy configuration capabilities in a license server 108 that allow a user 102 to define policies based on different a countries or geopolitical regions such as Europe, Africa, Southeast Asia, etc. This includes the ability for the user such 102 as a independent software vendor (ISV) to set license policies 120 in the license server 108 client tool as well as those license configurations to be utilized by license servers 108 through upload of a configuration file. Preferably, the user 102 like the ISV or a license server administrator can adjust these license policies 120 after the initial setting of the license policy.

The license server 108 must be capable of determining, if the user 102 is in compliance with the country-based license policy 120 when the application phones home to a license server 108 from a user's computer. Web services exist today which provide reverse Internet Protocol (IP) address lookups that determine a user's geographic location based on the IP network address of the user's computer. For example, a company named Digital Envoy which has offices at 250 Scientific Drive, Suite 800, Norcross, Ga. 30092 provides such a reverse IP lookup web service named NetAcuity. A phone home function for a registered software license would use the IP address of a user's computer at the time of a phone home operation to determine the present country location of the user's computer and compare that present country location with the country limitation of the registered software license. In addition, a storefront 106 could use a user or customer provided billing country in tandem with a reverse IP lookup determined country for a user's computer to define the country for which that license is available. It will be appreciated by those skilled in the art that many different country-based license policies 120 could be defined regarding the license validation and any acceptable exceptions to the license policies.

Figure 10:
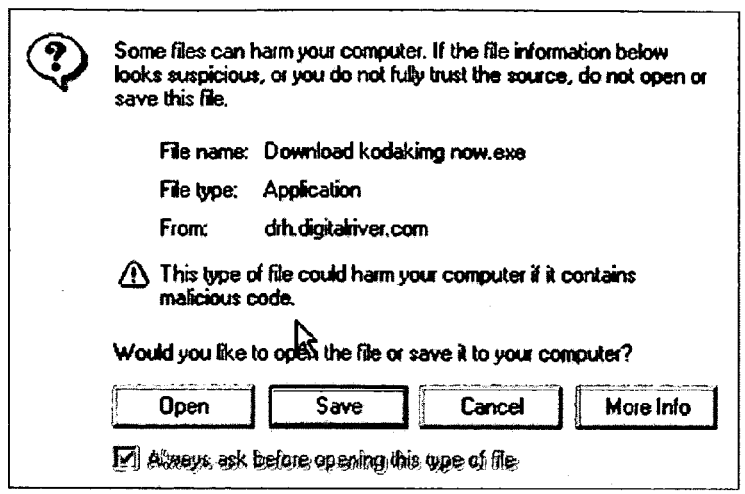
FIGS. 10, 11 and 12 show representative dialog boxes displayed to a customer who selects a particular software application to download from a web-based storefront.
Figure 11:
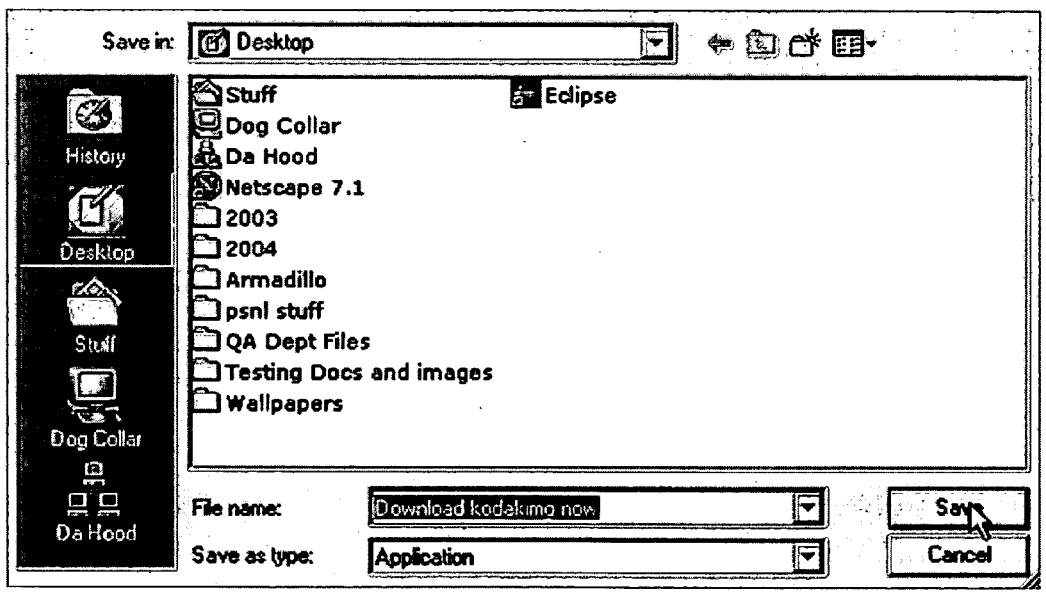
Figure 12:
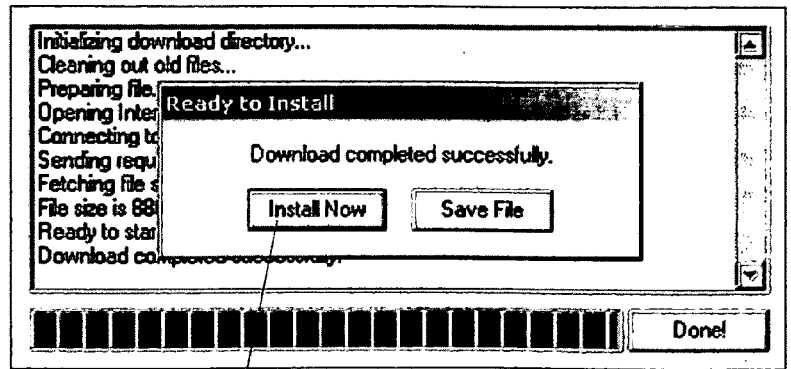

In operation, a customer or user 102 obtains a software wrapper 104 that has a particular software application 112 consisting of several protected files. The software wrapper 104 can be obtained by copying it from a computer readable medium such as a compact disk (CD) or digital video disk (DVD). In the preferred embodiment, a user 102 obtains the software wrapper 104 by downloading it to the user's computer from an e-commerce web-based storefront 106. FIGS. 10, 11 and 12 show representative dialog boxes displayed to a user or customer 102 who selects a particular software application to download from a web-based storefront 106.

Figure 13:
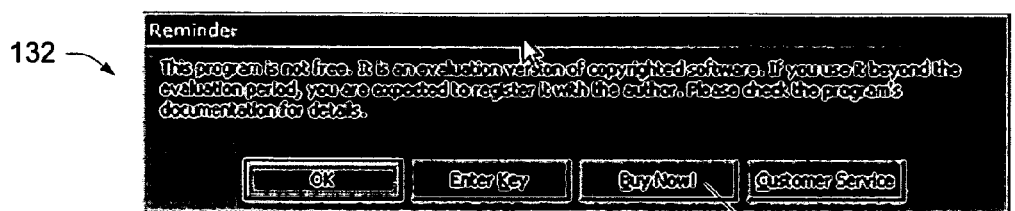
FIG. 13 shows a representative dialog box that can be presented to a customer to remind them to purchase a licensed copy of a software application that has been installed on the customer's computer system.

Once the software wrapper 104 is downloaded and the user 102 installs the software by selecting an install now button 130 shown in FIG. 12, a dialog box 132 similar to the one shown in FIG. 13 can be presented on a reminder display to the user 102. This dialog box 132 can be presented to a user or customer 102 to remind them to purchase a licensed copy of a software application that has been installed on the customer's computer system.

Figure 14:
FIGS. 14 and 15 shows a sample software purchasing order form that could be displayed in response to a customer selecting the buy now option shown in the reminder dialog box shown in FIG. 13.
Figure 15:
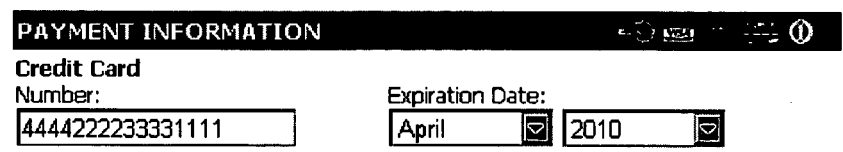

Once the user selects 150 the buy now option button 134 shown in FIG. 13, a software purchasing order form such as the sample order form 136, 138 shown in FIGS. 14 and 15 is displayed. When the buy now option button 134 is selected 150, the software wrapper 104 opens a browser 152 and initiates contact to a storefront 106 via a communication link such as a wired or wireless internet connection. The storefront 106 performs a phone home function 153 by: (i) contacting the license server 108, (ii) checking to ensure that the item being purchased matches the country or geographic location of the user 102 user an IP reverse lookup as previously described and (iii) conveying the IP reverse lookup results back to the storefront 106. If the IP address associated with the user 102 matches the item being purchased, then the storefront 106 sends information for displaying 154 this order form 136, 138 through the software wrapper 104 to the user 102. Otherwise, the storefront 106 sends an error message to the user 102 or changes the order to the correct item to be purchased for the geographic location of the user 102. Subsequently, the user 102 fills in the first part of the order form 136 and the second part of the order form 138 that includes payment information. Once that is completed, the user 102 submits the order 156 to the storefront 106 by selecting the submit button 140.

When the storefront 106 receives the order, the storefront 106 processes the order in a manner well known by those skilled in the art of electronic commerce by verifying the information, obtaining payment, creating a software license entitlement, submitting the software license entitlement 158 to a license server 108 and responding to the order 160 with a receipt that includes an order ID, if the software purchase order process completes successfully. Based on receiving the order 160 receipt information, a receipt and license installation dialog box is shown to the user 102 like the sample dialog box 142 shown in FIG. 16. When the finish option button 144 is selected, the software wrapper 104 attempts to retrieve 162 an unlock key by submitting a request to the license server 108.

The license server 108 checks 164 for any software license entitlements that match the order ID. During the checking process 164, the license server preferably performs an additional check with a phone home function 164 similar to the phone home function 153 by: (i) checking to ensure that the item being purchased still matches the country or geographic location of the user 102 user an IP reverse lookup and (ii) permitting a license key to be injected into the software wrapper 104 when the IP reverse lookup results are favorable. The license server 108 injects 166 the key into the software wrapper 104 after a successful phone home function 164. Otherwise, when the geographic location limit associated with the Order ID and the IP address based location of the user 102 do not match, the injection of a license key is denied to the user 102. FIG. 17 shows a sample error message 146 shown to a customer that attempts to install a software license on a computer system that violates a licensing policy (e.g., a geographic use limitation) embedded in the wrapped software application.

Software Wrapper

Country-based software license pricing preferably involves configuration of a wrapper license technology to support a model where the wrapper 104 will phone home to a license server 108 on a periodic basis and check to see that the user 102 is using the application within the geographic boundaries associated with a license. For example, a user buys an application to be used in Russia. They give it to their buddy in Germany and they start using the application. The software wrapper 104 or application phones home on a scheduled basis and asks 168 the license server 108 to validate 170 the geographic locale against the incoming IP address. The license server 108 returns 172 true/false or success/failure based on the results. If the user 102 is non-conforming the wrapper needs to work through a few escalation paths until the user either resolves the issue, buys a license for the new geographic locale, or the wrapper disables the application. FIG. 18 shows a sample warning message 148 that can be shown to a user 102 when a violation of a licensing policy embedded in a wrapped software application or software wrapper 104 is detected.

The software wrapper 104 and license server 108 preferably implements one or more key business rules through an inter-process communication 116 with a wrapper interface 110 that encapsulates the protected files 112 in the wrapper 104 by security software code to protect the software application files 112 from unauthorized access.

The wrapped software product or software wrapper 104 will phone home 170 to the license server every 21 days or the first time an Internet connection is detected after 21 days. This will allow the license server policy center to validate the product can continue to be used by that local computer machine. The ISV should be able to configure this setting to different lengths of time at the product level, with a default setting of 21 days.

All phone home activity will be transparent to the user 102 unless a violation of licensing policies occurred, in which case the wrapper 104 will inactivate the protected product 112 by communicating through a conduit 114 between the wrapper interface 110 and the protected files 112. Also, a firewall or other Internet listening device may alert the user 102.

Upon confirmation of an invalid license, the license server 108 will inactivate the protected product's 112 usage, reverting to the trialware nag screen 132 shown in FIG. 13 for purchase of a full license. No further usage of the protected product 112 will be allowed.

The inter-process communication 116 between the wrapper 104 and a license server 108 could be accomplished with several different software programming frameworks. In one embodiment, a SOAP-XML (single object access protocol-extended markup language) framework is used in an Internet web environment to perform the tasks of communicating the license software key and current IP address to a license server 108 and returning a valid license confirmation signal to the local response to the user's 102 local computer. It will be appreciated by those skilled in the art that a web server acting as the license server 108 could generate a SOAP-XML message and make possible Internet web services by using DLL (dynamic linking library) files and ActiveX components, if the SOAP-XML message is written by an ASP (active server page). Alternatively, EJB (enterprise java beans) and service server for changing the SOAP-XML message to a DTD (document type definition) type SOAP-XML message could be used, if the SOAP-XML message is written by a JSP (java server page). Additional gateway or bridging code may also be needed for interfacing with a DB (database) server, if the DB server can not directly accept SOAP-XML messages or EJB queries.

The software wrapper 104 needs the ability to define a license policy that is tied to a geographic boundary. The country could be determined in the wrapper 104 at the time of the configuration or it could be bound to the license dynamically on the backend based on what they purchased. The second option is the most flexible and should be considered the primary method if possible.

A setting is needed for the frequency of how often the wrapper 104 checks with the license server 108 to determine if the user 102 is in conformance with the license.

As previously described, the wrapper 104 will send 168 to license server 108 or license policy center the license key (encrypted) and the locale settings. The policy center will take the license key, check 170 for validity of the requisition ID (for fraud/charge backs/returns) and receive IP information from NetAcuity. If the key and ReqID are valid, and NetAcuity resolves to the original country and billing address at purchase, wrapper 104 will receive 172 a 'confirmation' message to continue with a valid license.

If data sent to policy center or license server 108 reveals violation of license policy, the wrapper 104 will allow 10 days of nonconformance through a violation counter before inactivating the protected program files 112. A warning message 148 as shown in FIG. 18 will be shown to the user 102. This will allow for travel and other unusual events. This functionality should be configurable at the product level.

The wrapper 104 will continue to request validation every other day past 10 days up to 5 times. After that, wrapper will inactivate product until a new license is obtained. The violation counter will reset to zero upon confirmation that the IP resolves to the appropriate country.

The nag screen or warning message 148 needs to support the following:

Notify the user of the violation

Display amount of time remaining until the hard expiration occurs

Provide a URL to purchase appropriate license (or just a link to the storefront)

Display the licensed country versus the one they are resolved to by the IP

Show a termination message when the protected product files 112 disables itself The software development kit needs to be extended to support the appropriate methods to allow someone using that mechanism to communicated and validate this type of license. Generally, the wrapper 104 will need to 'lock down' the protected product files 112 and disallow usage of the software program upon violation of the policies 120 or in the event the requisition state is changed to returned/refunded/chargeback.

Figure 3:
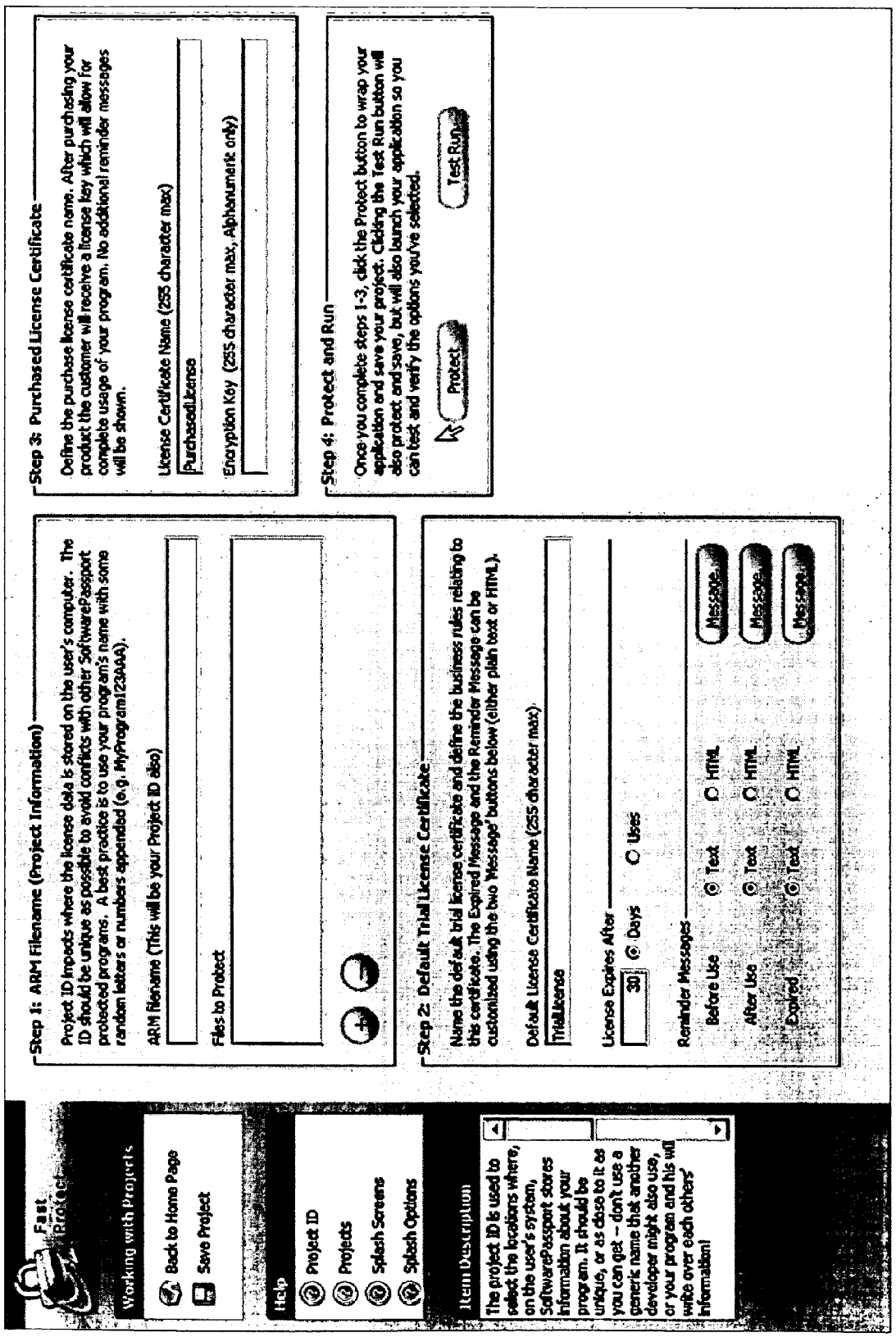
FIGS. 3 and 4 show user interfaces for a software protection utility that wraps a software application with a license policy and other data into a protected software application.
Figure 4:
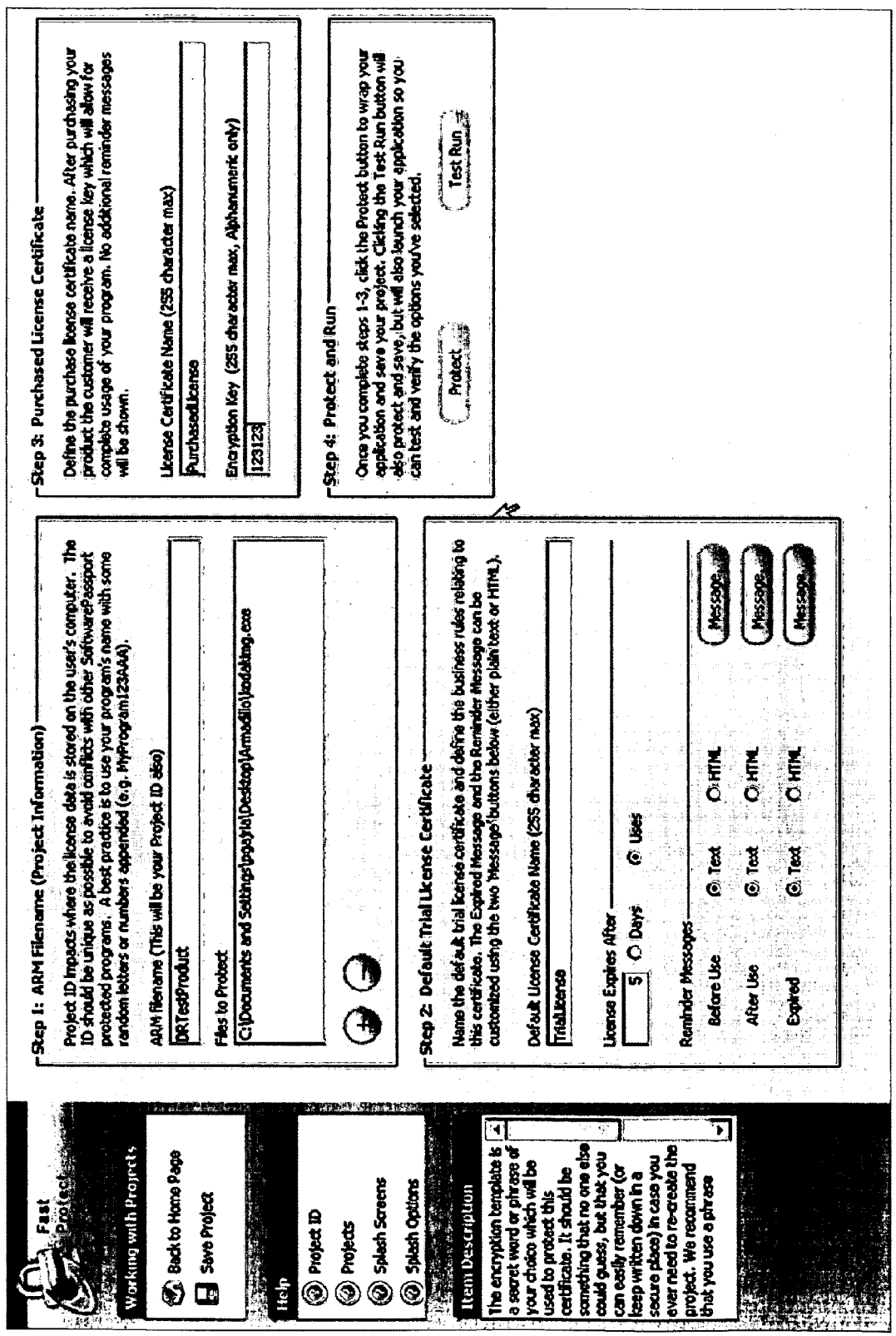
Figure 5:
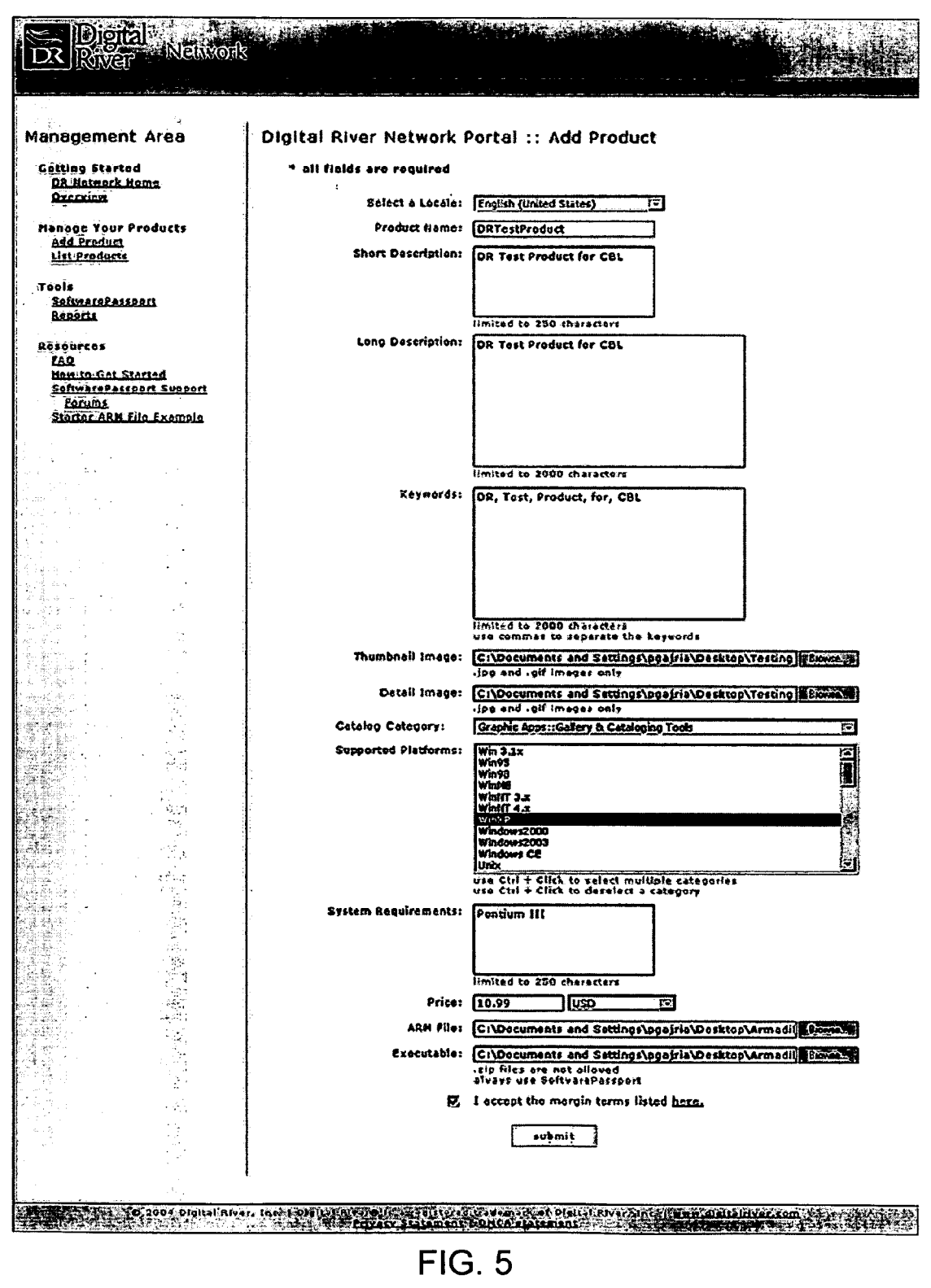

FIGS. 3 and 4 show user interfaces for a software protection utility that wraps a files 118 of software application with a license policy and other data into a protected software application or protected files 112. It will be appreciated by those skilled in the art that software wrapping utilities may also be web-based. For example, FIG. 5 shows a user interface for adding additional product information for a wrapped software application on an administrative website.

Figure 9:
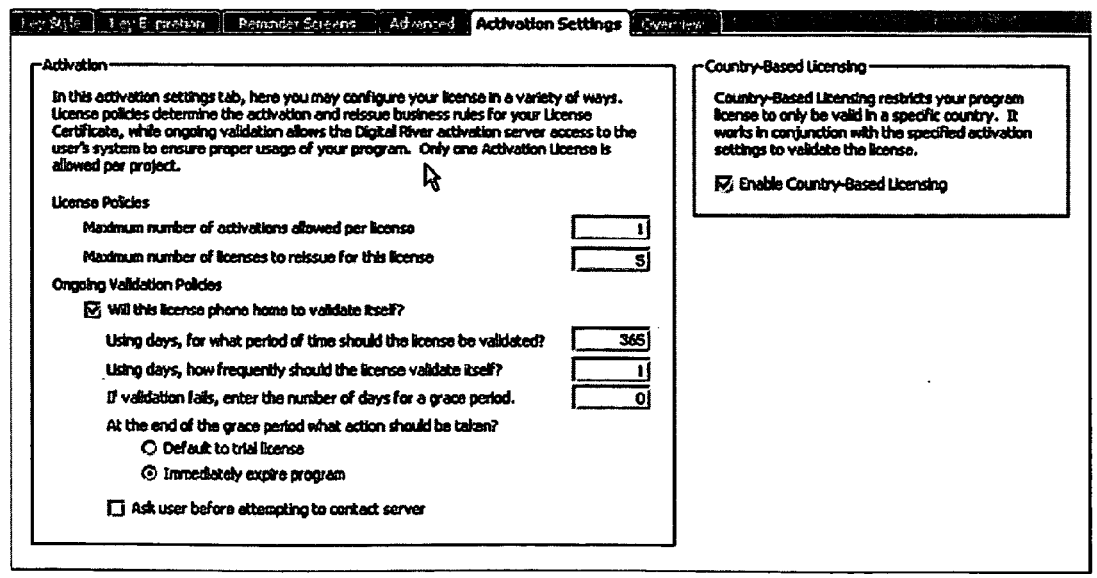

FIG. 6 shows a dialog box indicating a wrapped software application has been added to an administrative website. Once added to the website or storefront 106, files may be searched by product ID, key words or other search criteria. For example, if the product ID 176 shown in dialog box 174 is used to perform a search, then the search results dialog box 178 as shown in FIG. 7 would be produced. To implement the country-based licensing schema 100, the software protection utility or web-based software wrapping utilities would need additional user interfaces such as those shown in FIGS. 8 and 9 for selecting various options of these licensing policies.

Store

The software products consisting of a collection of files 118 in electronic storefront 106 need to support complex license policies 120. These license policies may include a security certificate template key, a project/product ID, a signature level, and some additional information based on options chosen by the user. These license policies 120 ideally would be included in configuration information or wrapper customization 122 associated with the software product files 118 being wrapped. The configuration of what country may be configured as part of the project ID in the electronic storefront 106. Upon purchase of the license the license activation server 108 will have to record for the future the country for the license as part of the license activation server record.

License Server

The license activation server or simply license server 108 needs to support a country-based license. Once a sale has occurred it will need to record the license type as country based and the country purchased.

When the wrapper 104 phones home 170 on a periodic basis it will require the license server 104 to validate the license. The license server 104 will take the incoming IP address and use NetAcuity to resolve the location of the caller's or user's 102 IP address and will then compare that to the billing country of the original requisition ID. If there is a problem it will notify the wrapper 104 of the issue.

The license server 108 may implement more complex license policies 120 and provide the necessary arbitration. Alternative configurations may be provided to handle unresolved IP addresses and other mechanisms without departing from the scope and spirit of the present invention. Unresolved IPs may, for example, revert to the billing country in requisition ID. License server 108 may flag unresolved IPs and attempt resolution as often as possible.

At any point, the license state could be changed to refund/chargeback/fraud and consequently the license server 108 will return to a wrapper call home an instant violation of license policy and inactivate protected product files 112 immediately.

In addition, customer service representatives (CSR) for the company managing the license server 108 should have information display screens that allow a CSR to see the serial number of the product, the activation history, the country of origin, current country and other necessary information for them to resolve disputes that occur in activations and management of the ongoing country-based license. Also, any CSR should be given the ability to override violation business rules upon request/demand.

A log of every customer service request needs to be made for historical purposes and for CSR screens. Information logged may include the serial number, hardware fingerprint, activation code, date, IP address, country resolution, order number. Customer service should be able to make informed judgments on whether or not to allow additional activations for a particular unit of software or purchased software license. In addition, they will want to arbitrate the facts about IP address issues and other types of problems. In order to do this they need to be provided with screens that allow them visibility to all the information relative to any license activation issue. CSRs will want to see a detailed report that provides a complete list of log information for the activation history of a purchased license. This includes the downloaded/serial number, unlock key, hardware fingerprint, name of licensee, IP address, IP country resolved, country for the license, dates, etc.

CSRs should to be able to override the blocking of an activation to enable the user to keep using the software for a specified number of days or up to a specified date. Ideally customer service needs to be able to query a list of all users in violation where termination is approaching so they can override and fix issues before they become a problem (i.e. chase down obvious things like IP addresses that don't resolve to anything, etc.)

The license server 108 may also have reports that enable the ISV or storefront 106 to review activation histories, revocations, and other pertinent information about country-based licenses.

A preferred embodiment implementation of the country based licensing schema 100 can be summarized as follows. A computer software license management system software wrapper 1044 for use in a local computer 102 is provided. A wrapper interface 110 in the wrapper 104 provides controlled access to a computer software application file 119. The software application file 119 is encapsulated by security software code to protect the software application file 119 from unauthorized access. A software license key is included in the wrapper 104 that identifies a license policy 120 specifying a use limitation within a geographic boundary. This geographic boundary may be substantially identically to a country border or an outer border of a collection of adjacent countries.

A license validation mechanism in the wrapper 104 is configured to periodically determine compliance with the license policy by utilizing 168 pre-existing communication infrastructure 116 such as an inter-process communication and http protocol communication channel (i.e., an internet link) to provide a communication link between the local computer 102 having the wrapper 104 and a license server 108. The license validation mechanism permits access by another process operating on the local computer 102 through the wrapper interface 110 in response to a valid license confirmation signal 172 received from the license server 108. Otherwise, the software wrapper 104 denies access 114 by another process operating on the local computer 102 through the wrapper interface 110 in response to an invalid license confirmation signal 172 being received from the license server 108.

The wrapper interface 110 preferably provides controlled access to a collection of computer software application files 118 that collectively form a software application. The software wrapper 104 can be configured to denies access by another process operating on the local computer through the wrapper interface for a variety of reasons. For example, denial may occur when a valid license confirmation signal 172 is not received from the license server 108 within a predetermined period of time. Also, the software wrapper 104 may permit access for a limited duration by another process operating on the local computer 102 through the wrapper interface 110 and cause the local computer 102 to display a warning message 148 about unauthorized use of the software application file 119 outside of geographic boundary specified in the license policy identified by the software license key. This warning message 148 may be in response to either an invalid license confirmation signal 172 being received from the license server 108 or no signal being received from the license server 108 within a predetermined period of time. Preferably this warning message provides an option to a user to purchase a license for the software application file 119 with a use limitation that includes a current geographic location of the local computer 102.

A computer software license management system 100 may include a software wrapper 104 and a license server 108. The license server 108 preferably is configured to perform several steps, such as:
  receiving a software license key and a current Internet Protocol (IP) address of the local computer over the communication link;
  determining a current geographic location for the received current IP address by performing a reverse IP address lookup in a geographic location cross reference to IP address database;
  retrieving a license policy having a use limitation with a specific geographic boundary from a license database based on the received software license key; and
  sending the valid license confirmation signal to the local computer via the communication link when the current geographic location is within the specific geographic boundary identified by the retrieved license policy.

A computer software license server 108 is also provided that includes a communication module for utilizing pre-existing communication infrastructure 116 to provide a communication link between the license server 108 and a remote computer 102. The communication module receives 162 a software license key and a current Internet Protocol (IP) address of the local computer 102. The license server cross references 164 a geographic location to an IP address database. The license server 108 also includes a license database having a several license policies 120. Each license policy is uniquely identified by a corresponding software license key. This license policy specifies a use limitation for a software application 119 within a geographic boundary. A license validation mechanism is configured to cause the communication module to send a valid license confirmation signal 166 to the remote computer 102 via the communication link. The license server sends such a signal 172 in response to: (i) identifying a current geographic location for the received current IP address by performing a reverse IP address lookup in the geographic location database, (ii) retrieving a specific geographic boundary use limitation from the license database based on the received software license key, and (iii) determining that the current geographic location is within the specific geographic boundary.

The license server 108 license validation mechanism 164, 170 is configured to cause the communication module to send a invalid license confirmation signal 166, 172 to the remote computer via the communication link, in response to: (i) identifying a current geographic location for the received current IP address by performing a reverse IP address lookup in the geographic location database, (ii) retrieving a specific geographic boundary use limitation from the license database based on the received software license key, and (iii) determining that the current geographic location is outside the specific geographic boundary.

An electronic storefront 106 also is provided for use by a consumer operatively coupled via a pre-existing communication link between a local computer 102 and the electronic storefront 106. The electronic storefront 106 includes several computer software license management system wrappers 104 available for download. Each wrapper 104 includes a software application 119 encapsulated by security software code to protect the software application file 119 from unauthorized access and a license policy specifying a use limitation within a geographic boundary. The electronic storefront 106 also includes a software purchasing application for requesting input of a billing information including a geographic location for billing in response to a consumer selecting one of the of wrappers 104 for download. The software purchasing application prevents 153 download of the selected wrapper 104, if the billing geographic location is outside of the geographic boundary specified in the license policy of the selected wrapper 104.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A computer software license server including a processor and memory, comprising:
    a communication module containing program code stored in memory which when executed by the processor in the server causes the server to perform the operations of utilizing pre-existing communication infrastructure to provide a communication link between the license server and a remote computer, the communication module receiving a software license key and a current Internet Protocol (IP) address of the remote computer;
    a geographic location cross reference to IP address database stored within the server memory;
    a license database stored within the server memory having a plurality of license policies, each license policy being uniquely identified by a corresponding software license key, at least one license policy specifying a use limitation for a software application within a geographic boundary; and
    a license validation mechanism comprising program code which when executed by the processor in the server causes the server to perform the operations of sending a valid license confirmation signal to the remote computer via the communication link, in response to: (i) identifying a current geographic location for the received current IP address by performing a reverse IP address lookup in the geographic location database, (ii) retrieving a specific license policy having a geographic boundary use limitation from the license database based on the received software license key, and (iii) determining that the current geographic location is within the specific geographic boundary identified by the retrieved license policy.

2. The license server of claim 1 wherein the license validation mechanism comprises code that when executed by the processor in the server causes the communication module to send an invalid license confirmation signal to the remote computer via the communication link, in response to: (i) identifying a current geographic location for the received current IP address by performing a reverse IP address lookup in the geographic location database, (ii) retrieving a specific license policy having a geographical boundary use limitation from the license database based on the received software license key, and (iii) determining that the current geographic location is outside the specific geographic boundary identified by the retrieved license policy.

3. The license server of claim 1 wherein the communication link comprises an electronic network link to the Internet.

4. The license server of claim 1 wherein the geographic boundary specified in the at least one license policy is substantially identical to a country border.

5. The license server of claim 1 wherein the geographic boundary specified in the at least one license policy comprises an outer border of a collection of adjacent countries.

6. The license server of claim 1 further comprising a reporting module which comprises program code which when executed by the processor causes the server to perform the operations of providing activation history of a particular software license key associated with a purchased license.

7. The license server of claim 1 further comprising a user interface operatively coupled to the license database and license validation mechanism, the user interface to enable a user to manage the plurality of license policies such that the user can override a particular policy violation and allow an activation of the software application associated with received software license key even though a license policy violation has been detected by the license server.

* * * * *